United States Patent
Grandi et al.

(10) Patent No.: US 10,435,303 B2
(45) Date of Patent: Oct. 8, 2019

(54) SOL-GEL PROCESS FOR THE PRODUCTION OF SILICA AEROGELS

(71) Applicant: N.A.M.—NANO ANALYSIS & MATERIALS S.R.L., Vigevano (IT)

(72) Inventors: Stefania Grandi, Tornaco (IT); Piercarlo Mustarelli, Pavia (IT); Andrea Nulli, Vigevano (IT); Cesare Achilli, Travacó Siccomario (IT)

(73) Assignee: N.A.M.—NANO ANALYSIS & MATERIALS S.R.L., Vigevano (IT)

(*) Notice: Subject to any disclaimer, the term of this patent is extended or adjusted under 35 U.S.C. 154(b) by 0 days.

(21) Appl. No.: 15/577,580

(22) PCT Filed: May 27, 2016

(86) PCT No.: PCT/IB2016/053117
§ 371 (c)(1),
(2) Date: Nov. 28, 2017

(87) PCT Pub. No.: WO2016/193877
PCT Pub. Date: Dec. 8, 2016

(65) Prior Publication Data
US 2018/0134567 A1    May 17, 2018

(30) Foreign Application Priority Data
May 29, 2015 (IT) .................. 102015000019211

(51) Int. Cl.
*C01B 33/158* (2006.01)
(52) U.S. Cl.
CPC ...... *C01B 33/1585* (2013.01); *C01P 2006/16* (2013.01)

(58) Field of Classification Search
CPC ........................... C01B 33/1585; C01B 33/14
See application file for complete search history.

(56) References Cited

U.S. PATENT DOCUMENTS

| 6,197,270 B1 * | 3/2001 | Sonoda | C01B 33/1585 423/338 |
| 6,210,751 B1 * | 4/2001 | Schwertfeger | C01B 33/1585 427/212 |
| 2007/0276051 A1 * | 11/2007 | Halimaton | C01B 33/1585 516/2 |

FOREIGN PATENT DOCUMENTS

| CN | 102757059 A | 10/2012 |
| DE | 19541715 A1 | 5/1997 |
| WO | 2008/044873 A1 | 4/2008 |

OTHER PUBLICATIONS

Shewale et al. "Effect of different trimethyl silylating agents on the hydrophobic and physical properties of silica aerogels" Applied Surface Science 254 (2008) 6902-6907 (Year: 2008).*

Kumar et al., "A Simple Process to Prepare Silica Aerogel Microparticles from Rice Husk Ash," International Journal of chemical Engineering and Applications 4(5):321-325 (2013).

Kien-Woh et al., "Physicochemical Properties of Bamboo Leaf Aerogels Synthesized Via Different Modes of Gelation," Applied Surface Science 301:161-172 (2014).

(Continued)

*Primary Examiner* — Amber R Orlando
*Assistant Examiner* — Syed T Iqbal
(74) *Attorney, Agent, or Firm* — Pepper Hamilton LLP

(57) ABSTRACT

A improved sol-gel process is described for the production of silica aerogels, in particular from plant raw materials, in particular from rice processing waste.

12 Claims, 2 Drawing Sheets

Diameter of pores (nm)

(56) References Cited

OTHER PUBLICATIONS

"Supercritical Drying," Wikipedia (2015) (retrieved Jan. 18, 2016).
PCT International Search Report and Written Opinion corresponding to PCT/IB2016/053117, dated Sep. 28, 2016.

* cited by examiner

SOL-GEL PROCESS FOR THE PRODUCTION OF SILICA AEROGELS

This application is a national stage application under 35 U.S.C. § 371 of PCT Application No. PCT/IB2016/053117, filed May 27, 2016, which claims the priority benefit of Italy Application No. 102015000019211, filed May 29, 2015.

FIELD OF THE INVENTION

The present invention relates to an improved sol-gel process for the production of silica aerogels. The process is preferably carried out starting from vegetable raw material, in particular from the ashes of rice straw and rice husks which contain relatively large amounts of silica, thus offering also the additional advantage of recycling useful material in a production which should otherwise be disposed of differently.

BACKGROUND

Aerogels are materials consisting of a solid structure with very high porosity. Although they may consist of oxides of various metals or metalloids or mixtures thereof, the far most common and industrially important aerogels are the silica ones; in the present invention, therefore, reference is made to silica aerogels, but aerogels formed by mixed oxides may also be obtained by the methods described herein, containing silica as a main component and percentages of up to 45% of oxides of other metals, typically tri-, tetra- or pentavalent.

Silica aerogels are solids in which most of the volume, up to more than 99%, is occupied by gas (typically air), and only the remaining volume moiety consists of solid material; due to their structure, these materials can have a few milligrams per cm$^3$ density and surface area values of between a few hundreds to about 1000 m$^2$/g. Due to these features, aerogels are designed and used for some particular scientific applications (such as spatial source particle absorbers), as catalysts or catalyst supports, and mostly as thermal insulators due to their very low thermal conductivity (from 0.004 W/mK to 0.03 W/mK).

Silica aerogels are produced through processes called sol-gel.

There are numerous variants of sol-gel processes, which however have certain features in common. In these processes, one or more silicon compounds (defined precursors in the industry) are dissolved in water or water-alcohol mixtures, obtaining a solution called "sol"; the compounds present in the sol are then reacted, generally by destabilizing the system by changing the pH, resulting in a wet "gel"; the gel is then dried, according to various methods, forming a dry gel.

More specifically, in the aqueous or water-alcohol solution, a precursor undergoes an initial hydrolysis reaction in which one or more hydroxyl groups bind to silicon; formally, the reaction can be written as follows:

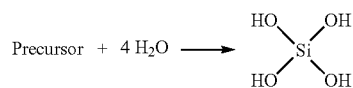

The species formed by hydrolysis of the precursor is normally defined as orthosilicic acid; in fact, as in the case of hydroxy compounds of other non-metals, it is an ampho-teric species, whose formula can be written with the notation H$_4$SiO$_4$, respecting the formalism of acidic species, or with the notation Si(OH)$_4$, more common in the field of sol-gels.

Orthosilicic acid has been observed only in highly diluted solutions since it is extremely unstable and spontaneously gives rise to the condensation reaction schematically represented below:

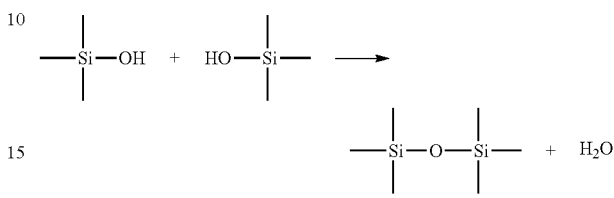

This reaction, repeated for all four —OH groups present on each silicon atom (polycondensation), leads to the formation of a three-dimensional pattern of Si—O—Si bonds and then to the oxide structure of the material.

The precursors used in sol-gel processes can be organometallic, such as the tetramethyl orthosilicate and tetraethyl orthosilicate compounds (of formula Si(OCH$_3$)$_4$ and Si(OC$_2$H$_5$)$_4$, respectively, generally referred to as TMOS and TEOS); or inorganic, among which the most common ones are the alkali metal silicate solutions of general formula M$_2$O×nSiO$_2$ (M=Na, K, Li), wherein n is between 0.5 and 4; this general formula includes both stoichiometric compounds, such as sodium silicate, Na$_2$SiO$_3$ (n=1), and non-stoichiometric compositions. While the sol-gel processes starting from organometallic precursors are widely studied and used for scientific applications, the cost of these compounds makes them unsuitable for use in large scale applications.

The present invention is therefore directed to the production of aerogels starting from alkali metal silicate solutions, which can be produced starting from chemical compounds or as by-products of chemical processes, or from plant material containing large amounts of silicon, such as some by-products of rice processing.

The direct product of polycondensation is the wet "gel", wherein the pattern of Si—O—Si bonds mentioned above forms an open structure that contains the solvent and reaction by-products in its porosities. The wet gel is usually subjected to washing step to eliminate the by-products (particularly if starting from inorganic precursors) and any soluble impurities, and/or exchange of the starting solvent with a different liquid to facilitate the subsequent drying operations.

The drying of wet gel can occur by simple evaporation of the liquid contained in the pores (thus obtaining dry gels called "xerogels"), or by extracting said liquid under supercritical conditions, resulting in the so-called "aerogels".

While evaporation is simpler to practice, xerogels normally undergo significant reductions in volume compared to the starting wet gels (reaching volumes of about ⅛ compared to the volume of the wet gel) and extensive disruptions during the process, and they have a morphology, from the point of view of the pore distribution, completely different from the starting one.

On the other hand, hypercritical drying allows obtaining whole aerogels, in the industry referred as monolithic, which retain the shape and size of the starting wet gel but especially the pore morphology and distribution: this latter feature is required for some of the applications mentioned above, particularly for thermal, acoustic and electric insulation.

As said above, the most common silicate used in sol-gel processes is sodium silicate due to its low cost, wide availability, solubility in water and non-toxicity; in the remainder of the description, therefore, reference will be made to this compound obtained from vegetable matrices, but the invention is of general applicability starting from alkali metal silicates obtained by any manner.

Sodium silicate solutions have a strongly basic pH; the condensation of sols obtained from these solutions is generally obtained or accelerated by varying the pH value, bringing it from the starting values (about 13-14) to values generally between 4 and 10, by acid addition.

Processes of this type are described in several documents, including for example:
  patent application CN 1449997 A, wherein HCl is added to a sodium silicate sol (which can have a concentration of between 0.01 and 1 kg/L) up to reach a pH of between 5 and 9;
  the patent CN 1317188 C, wherein HCl is added to a sodium silicate sol (having a concentration of between 0.02 and 0.05 kg/L) up to reach a pH of between 6 and 8;
  the U.S. Pat. No. 6,210,751 B1, wherein a sodium silicate sol with strongly basic pH is made to pass on an acidic ion exchange resin to remove sodium, or alternatively, an acid is poured in the silicate solution to then separate the resulting precipitate ($Na_2SO_4$), cooling the system to achieve an effective precipitation. In both cases, pH values of less than 4 are reached in the sol resulting from the treatment, to which a base (typically NaOH) is then added to bring the pH to a value of about 4.7;
  the patent EP 1689676 B1, wherein rice husks are thermally treated at 700° C. until obtaining an ash, which is possibly prewashed with sulfuric acid; the ash is treated with NaOH, thus obtaining a sodium silicate sol, to which sulfuric acid is added, and after "aging" of the gel, it is washed with water to remove the resulting $Na_2SO_4$ salt; finally, the water in the gel is exchanged with an alcohol (typically ethanol) by means of a procedure with Soxhlet column, which is finally extracted under supercritical conditions;
  the patent application WO 2005/044727 A1, wherein a solution containing $Na_2O$ and $SiO_2$ in a molar ratio of between 1:3 and 1:4 and between 1 and 16% by weight of $SiO_2$ is admixed with concentrated sulfuric acid (96% by weight solution; the final pH obtained is not indicated);
  the article "Rice husk ash as a renewable source for the production of value added silica gel and its application: an overview", R. Prasad et al., Bulletin of Chemical Reaction Engineering & Catalysis, 7 (1), 2012, 1-25;
  the article "A simple process to prepare silica aerogel microparticles from rice husk ash", R. S. Kumar et al., International Journal of Chemical Engineering and Applications, Vol. 4, No. Oct. 5, 2013;
  and the article "Preparation of silica aerogel from rice hull ash by supercritical carbon dioxide drying", Qi Tang et al., J. of Supercritical Fluids 35 (2005) 91-94.

In these three articles, solutions of $Na_2O$ and $SiO_2$ having a concentration of about 0.03 kg/L obtained by dissolving a precursor of $SiO_2$ with NaOH having a concentration of 1 M is admixed with HCl, typically in turn having a concentration of 1 M, until a pH of between about 6 and 7 is obtained.

These known methods give rise to two types of problems.

Firstly, while adding the acid in the basic silicate solution, pH gradients are created which may lead to structural unevenness in the final gel.

Secondly and more importantly, during the gel formation step (beginning at about pH 10), this retains the alkali metals due to the slight acidity of silica within the porosity that is formed following polycondensation: these must be completely removed from the wet gel to prevent undesired consequences on the final aerogel, such as the tendency to become a dense glass already at relatively low temperatures (such as 600-700° C. in the case of sodium, depending on the content of the element).

The removal of alkaline and alkaline-earth elements from the wet gels is however a lengthy operation, given the very reduced size of the porosity of the same; in order to overcome this problem, it is known to subject the sodium silicate solutions, prior to gelling, to treatments with ion-exchange resins in order to replace the alkaline ion (e.g. $Na^+$) with $H^+$, or the separation of the salts formed by precipitation when adding acid. These operations increase the time required and complexity, and therefore the cost, of the overall process. Ion exchange treatments are described for example on page 50 (chapter 3, paragraph 3.2.1) of the book "Advances in Sol-Gel Derived Materials and Technologies", edited by M. A. Aegerter and M. Prassas, and an example of these treatments for the removal of sodium is the process described in U.S. Pat. No. 6,210,751 B1.

Patent application CN 102757059 A follows a partly different method compared to the previous documents. The procedure is similar to that of patent EP 1689676 B1, but the sodium silicate solution is added to the acid one, controlling the addition so as to achieve a final pH of between 3 and 4. In order to effectively separate the salts precipitated from the gel, this is subjected to an electrophoretic treatment, introducing it into a container filled with water and applying an electric field to the system by two electrodes immersed in the water surrounding the gel, so that the positive ions are extracted from the gel and attracted towards the negative electrode. In addition to the process complication consisting of this further step, the present inventors have verified that it is very difficult to control the pH of the system to values of between 3 and 4, and that at these pH values, gelling occurs in a too early step of the process (approximately within two minutes from the mixing of the solutions), leading to an uneven system in which flocking gel fragments are observed within a still liquid phase.

The need is therefore still felt in the field to have a process for preparing silica aerogels starting from products having industrially acceptable costs and which is free from the drawbacks and complications of known processes.

SUMMARY OF THE INVENTION

The object of the present invention is to provide an improved sol-gel process for producing a silica aerogel comprising the steps of:
  preparing an aqueous solution of an alkali metal silicate;
  separately preparing in a container a solution of a concentrated inorganic acid selected from sulfuric, hydrochloric, nitric and phosphoric acid;
  combining the silicate and acid solutions;
  keeping the system rest up to the formation of a wet gel;
  washing the wet gel just produced with water to then exchange the liquid phase present in its pores with a liquid volatile organic compound (VOC) and thereafter possibly with liquid carbon dioxide;

drying the gel by extraction in hypercritical conditions of said liquid organic volatile compound;

characterized in that said step of combining the silicate and acid solutions is carried out by pouring the silicate solution in the acid solution, operating so that the pH of the system always stays below 1, and preferably of about 0 or less.

As mentioned above, the process of the present invention differs from the known ones in the methods of forming the solution that is subjected to gelling.

Firstly, contrary to what is commonly done in all known processes, in this case the silicate solution is poured into the acid one: in this way, the silicate is always at a pH of less than 1 and the strong differences in pH that occur in pouring the acid in the silicate solution do not occur (a situation in which the acid addition area is at a pH close to 0 and the more distant areas of the silicate solution are at the starting pH, generally above 13) that lead to unevenness in the final gel.

Secondly, the inventors have observed that a gelling that occurs with the system constantly kept at a pH below 1 has the advantage that the gelling is slower than that which occurs under basic conditions, and is therefore more easily controllable (without having to cool the system as in the process of U.S. Pat. No. 6,210,751 B1) and of easy industrial applicability; furthermore, in the case of gelling from a basic solution, this initially contains an excess of alkali metal (such as $Na^+$ or $K^+$, introduced as counterions of the hydroxyl ion) the removal of which, as mentioned above, requires long times, while the acid solutions of the present invention contain, as a counterion of the $H^+$ ion, anions such as $Cl^-$ or $NO_3^-$, the removal of which from the wet gel is faster and easier and can be accomplished by simple washing with water.

These and other advantages are made more apparent from the following detailed description.

DETAILED DESCRIPTION OF THE INVENTION

Figure 1:
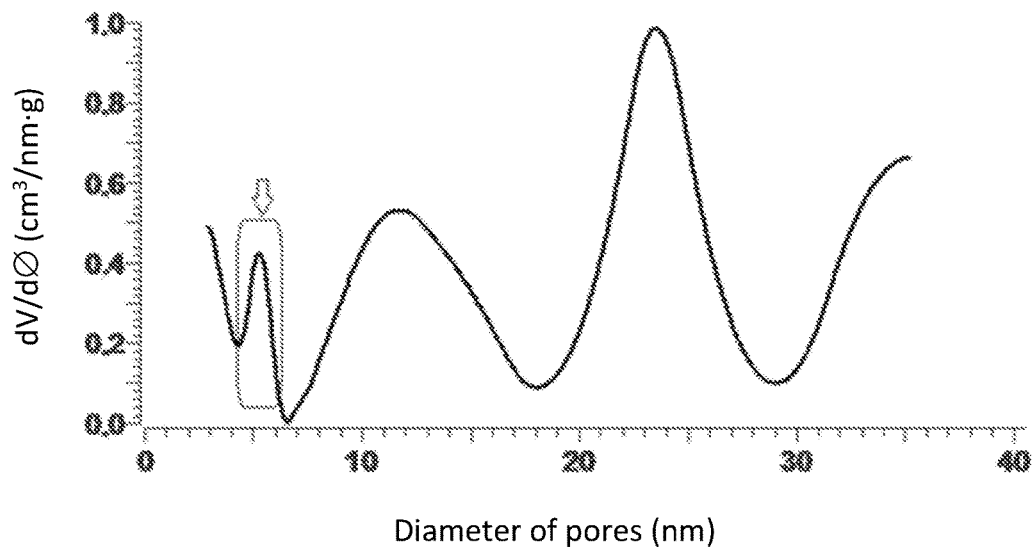
FIGS. 1 and 2 show the distribution of the porosities of two aerogels produced according to the invention.

The reagents used in the process of the invention, as well as the operating conditions of certain steps, are similar to reagents and conditions of similar steps of the prior art processes and are therefore described briefly hereinafter; the characterizing operating methods of the present invention will be described in detail. An aqueous solution is used as a precursor of silicon in the present invention containing a composition $M_2O \times nSiO_2$ (M=Na, K, Li), wherein n is between 0.67 and 4. These solutions can be obtained by treatment with alkali hydroxides of silica-containing compounds.

For example, it is possible to obtain a solution of this type from the dissolution of the glass of old cathode ray tube screens, in processes dedicated to their disposal (separating the lead content with appropriate selective precipitation steps), by treating the glass with boiling concentrated alkali hydroxide solutions.

Alternatively, and preferably, the starting silicate solution is obtained by treating with hydroxide the ashes derived from the combustion of plant biomasses containing at least 10% by weight of silica. Examples of biomasses useful for the purposes of the present invention are oats, bamboo leaves, and in particular rice husk or rice straw. Normally, the ashes of these biomasses contain at least 50% by weight, and often more than 80% by weight of silica. The process of the invention can also be carried out starting from the ashes with lower silica content, but this leads to lower yields and involves the need to carry out steps of concentration of the solutions obtained from the ashes prior to those of the process itself.

Before treatment with the alkaline hydroxide, these ashes can be optionally subjected to washing with acids, such as $HNO_3$, to remove all the water soluble substances and all the acid soluble oxides/salts, so as to obtain a purer starting product; the solid moiety containing the silica is recovered by filtration of the solution. The methods of carrying out these optional preliminary washes are known in the industry.

The ash (pre-washed or not) is suspended in an alkaline hydroxide solution, preferably NaOH or KOH, in a concentration ranging from 10% to 20% by weight (or a 1M solution). The ratio between the alkali metal and silica (the amount of which in the ashes can possibly be determined by preliminary guidance analysis) can be over-stoichiometric, stoichiometric or sub-stoichiometric, being able to achieve a molar ratio of between 1.5:1 and 1:4 between $M_2O$ and $SiO_2$ in the above formula.

The suspension is heated to reflux for a few hours, and the resulting solution is subjected to centrifugation steps (to remove the heavy solid residue) and filtering (to remove the lightweight solid carbonaceous residue), obtaining a limpid silicate solution. The silicate solutions useful for the invention are those containing between 50 and 150 mg/mL of $SiO_2$.

Separately, a solution of a concentrated acid, preferably hydrochloric or nitric acid, is prepared in a suitable container; solutions useful for the purposes of the invention are for example a solution of HCl 37% by weight and a solution of $HNO_3$ from 40 to 65% by weight.

The container is first selected as a function of its shape, since as mentioned above, the final aerogel has the shape of the container in which the gel is formed. Moreover, it must exhibit some chemical features: firstly, it must of course be inert to concentrated acids, as well as to the mixtures that are formed during the process; also, it must be made of a material such that the wet gel does not adhere to its walls. Conveniently, the container is made of thermoplastic polymers, such as polyethylene (PE), polypropylene (PP), polyethylene terephthalate (PET) or polytetrafluoroethylene (PTFE); alternatively, the container may be made of alloys such as AISI 321, AISI 316, AISI 316L steels, Inconel alloys (containing, in order of percentage amount, nickel, chromium, iron and other elements including molybdenum, manganese, cobalt, etc.), or alloys known by the abbreviation Alloy 20 (containing from 32.5 to 35% by weight of nickel, from 19 to 21% of chromium, less than 5% of other elements from carbon, copper, molybdenum, manganese, silicon and niobium, and the balance to 100%, between 31 and 44% of iron); finally, the container may be made of metal internally coated with a thermoplastic material, preferably PTFE.

The amount of acid should be such that, at the end of the addition of all the silicate solution, the pH of the system is less than 1: this ensures the achievement of the required condition, i.e. that the pH of the system is less than said value throughout the procedure of combining the basic solution with the acid. Said amount can be obtained by simple stoichiometric calculations by a laboratory chemist, or it can be determined by preliminary orientation tests on small amounts of the acid and silicate solutions.

According to the characteristic embodiment of the present invention, the prepared silicate solution is added to the container in which the concentrated acid solution is already present. In order to promote the mixing of the two solutions, and thus prevent the pH from locally exceeding the value of 1, the addition of the silicate solution is carried out under vigorous stirring and with pH control; preferably, the pH must remain equal to or below 0. It is possible to achieve pH values of less than 0 by operating with highly concentrated acid solutions, but as known, measuring instruments give not entirely accurate values in this pH range, and the less accurate the more the pH becomes negative; therefore, it is not possible to accurately indicate the lower limit of the pH range, but taking into account a possible maximum error of 50% of the value indicated by a pH meter, it can be assumed for practical purposes that the lower limit of the pH useful for purposes of the invention is about −1.

It is also known that the value directly read by a pH meter is not a pH value but a potential difference, which is then transformed into a pH value by an internal algorithm of the instrument (the calculation formula for the conversion from voltage to pH, based on the well-known Nernst equation, is common to all commercial instruments). Therefore, if desired, during this operation it is also possible to check the value of the potential difference directly measured by the instrument, possibly after checking, with preliminary guidance tests, the values of the potential difference which lead to aerogels with the desired features; in orientation tests of this type, the present inventors have verified that the desired results (firstly, the ease of removal of ions from the final gel) are obtained constantly if the measurement of the potential difference during this step of the process is higher than 400 mV.

The volume ratios between the two solutions can vary within a wide range, provided that the condition that the pH does not exceed the value of 1 is met; to give an indication of the relative amounts of the two solutions to the man skilled in the art, and always considering a silicate solution containing 100 mg/mL $SiO_2$, typical volume ratios between the silicate solution and the acid one are about 1:1 in the case of a HCl solution at 37% by weight, and about 2:1 or 1:1 in the case of a solution of $HNO_3$ at 65% by weight.

The volume of the silicate solution added to the acid should be such that the final density of the aerogel is between 0.01 and 0.3, preferably between 0.05 and 0.12 g/mL, selected in advance depending on the application. This feature can be predetermined, during the process design, by defining the volumes of the silicate and acid solutions, the sum of which will be roughly equal to the final aerogel volume, and the amount of $SiO_2$ present in the silicate solution, which will determine the weight thereof. The final aerogel may exhibit small deviations from the density theoretically calculated in advance in this way, due to the inaccurate additivity of the volumes of different solutions, and due to the fact that the wet gel undergoes a slight volume restriction compared to the starting solution (a phenomenon known as "syneresis"); these slight deviations from ideality may however be taken into account in the starting calculation, or compensated, following preliminary guidance tests.

After the end of the addition of the silicate solution to the acid one, the system is allowed to rest to allow the gelling: at room temperature, this operation requires a time of between 10 and 60 minutes. The wet gel thus obtained is then subjected to exchange of the liquid phase present in its pores, by simple immersion in a bath of the exchange liquid or under a flow of the same. The first exchange is generally a washing carried out with water to effectively remove the inorganic components. Thereafter, as known in the field, further exchanges may be carried out depending on the final liquid in which the hypercritical extraction will be carried out.

In the present invention, said final liquid is selected from ethyl acetate and liquid $CO_2$. In the case of hypercritical extraction of ethyl acetate, after washing with water the gel is preferably first subjected to exchanges with acetone/water mixtures gradually richer in acetone, and finally with pure acetone, before the final exchange with ethyl acetate.

Depending on the final application, during the solvent exchanges it is possible to introduce a gel silanization step, which can be carried out by the addition of alkylchlorosilanes (compounds of general formula $R_3$—Si—Cl, wherein the three R substituents, equal to or different from one another, are alkyl radicals), so as to introduce $R_3$—Si— groups on the surface of the final aerogel pores and make it hydrophobic and compatible with some organic materials.

In the case of hypercritical extraction of liquid $CO_2$, it is possible to carry out the exchange starting from the gel washed with water and then with one or more washings with acetone or other liquid volatile organic compound. The methods of liquid phase exchange in the wet gel are well known in the industry and within the reach of the man skilled in the art.

The wet gel containing ethyl acetate or liquid $CO_2$ as liquid phase is then subjected to the hypercritical extraction of said liquid phase, according to methods well known in the industry; the operation is carried out in an autoclave and requires a temperature of 251° C. and a pressure of 39 bar in the case of ethyl acetate, and a temperature of 31° C. and a pressure of 74 bar in the case of liquid $CO_2$.

The dry gel obtained by hypercritical extraction can then, if necessary, be subjected to a heat treatment in an oxidizing atmosphere, for example oxygen, air or synthetic oxygen/nitrogen mixtures, for the removal of organic residues; in the case of non-silanized aerogels, the treatment can be carried out in a wide temperature range, generally of between 300 and 800° C., such as at 450° C., while in the case of silanized aerogels it is preferable not to exceed 300° C. In the case of hypercritical extraction of liquid $CO_2$, this treatment is not necessary.

The aerogels obtained according to the invention are mesoporous, with hydrophilic or hydrophobic features for different uses. The aerogels obtained according to the process of the invention typically have the features shown in Table 1.

TABLE 1

| Properties | Value of the aerogels of the invention |
| --- | --- |
| Apparent density | 0.05-0.1 g/mL |
| Specific surface area | 400-900 m$^2$/g |
| Porosity | 96-98% |
| Average pore diameter | 14-25 nm |
| Hydrophobicity/hydrophilicity | Hydrophilic |
| Characteristic porosity | 4-6 nm |
| Total thermal resistance | Up to 1000° C. |
| Thermal conductivity | 0.015-0.030 W/m · K |

The invention will be further described by the following examples. In the examples, all concentrations and percentages are by weight unless otherwise indicated.

Example 1

15 g of ash resulting from combustion of rice husk are suspended in 180 ml of a 10% NaOH solution.

The suspension obtained is heated to reflux for 4 hours, resulting in the partial solubilization of the solid. The obtained solution is firstly subjected to a centrifugation step (5 min, 6000 rpm) to remove the solid, not solubilized and heavy fraction, and then to a filtration step, to remove the lightweight solid carbonaceous residue. A limpid sodium silicate solution is so obtained. A small amount of this solution is analysed to determine the concentration, relative to the amount of silica, which is equal to 72 g/L.

Separately, 165 mL of 37% hydrochloric acid are introduced in an appropriate cylindrical container of teflon.

150 mL of the sodium silicate solution obtained as described above are added to the concentrated acid solution; this operation is carried out under vigorous stirring, provided by a mechanical blade stirrer.

The pH of the solution being formed is measured throughout the operation with a pH meter: the value given by the instrument remains constantly less than −0.5. The pH meter used is a Crison Basic 20 with a Crison cat. No. 52-02 glass electrode.

At the end of the addition, stirring is stopped and the solution is left at rest for 30 minutes.

At the end of this period, a wet, well consolidated gel is obtained; the gel, maintained in a container of teflon in which it was formed, is washed in continuous conditions, by making a flow of water flowing on the same; due to the high acidity of the liquid contained in the gel pores, washing water coming out from the container has initially a pH close to 0; washing is continued until the pH of the washing water reaches pH 2; thereafter, the gel is washed with acetone until the concentration of water in acetone is less than 10% (checked by Karl Fisher titration); finally, the acetone is exchanged with ethyl acetate. The wet gel, still inside the container in which it was formed, is put in an autoclave and the solvent is extracted from the gel in supercritical conditions: during the liquid extraction process, lasting 8 hours, the maximum temperature varies between 275 and 295° C., the maximum pressure between 55 and 65 bar.

The dry aerogel is then extracted from the autoclave and subjected to a heat treatment at 450° C. in air for two hours, to remove any traces of residual organic impurities of the process.

The dry gel so obtained has a density of 0.056 g/ml, a specific surface area of 553 m$^2$/g, mesopores with average diameter of 14 nm, porosity 97.5%, thermal conductivity of 0.021 W/mK and thermal resistance up to 1000° C.

Example 2

15 g of ash resulting from combustion of rice husk are treated with 180 mL of 1M $HNO_3$ for 2 hours.

The obtained solution is filtered and the residue collected on the filter paper is washed with 25 mL of water. The filtrate is allowed to dry for about 1 hour.

The dried ash is then treated as described in Example 1, obtaining at the end a dry gel with characteristics similar to those of Example 1.

Example 3

The test of Example 1 is repeated, but using 300 mL of 45% nitric acid; a dry gel is obtained with characteristics similar to those of Example 1.

Example 4

The test of Example 3 is repeated, but the final drying is made by using supercritical $CO_2$.

To do this, the initially wet gel obtained is washed with water until the washing water reaches pH 2, after which it is washed for 12 hours with a volume of acetone 5 times the volume of the gel. After removing the washing acetone, the wet gel (still in the container in which it was formed) is put into an autoclave and the solvent is first exchanged with liquid $CO_2$ and then dried under supercritical conditions. During the extraction process, lasting 4 hours, the maximum temperature varies between 40 and 50° C., the maximum pressure between 85 and 105 bar; a dry gel is obtained with characteristics similar to those of Example 1.

Example 5

The test of Example 1 is repeated, with the following changes to the test parameters:
- 45 g of ash and 300 mL of 10% NaOH are used; in this way a $Na_2O:SiO_2$ molar ratio lower than 1:1 is obtained in the solution (sub-stoichiometric solution);
- the silicate solution so obtained (240 ml) has a concentration of $SiO_2$ equal to 102 g/L;
- 80 mL of 65% nitric acid are used for gelling;
- the suspension is conducted for a period of 80 minutes to the boiling point T.

A dry gel is obtained with characteristics similar to those of Example 1.

The sample is subjected to a measurement of the porosity size distribution. The instrument used is a Carlo Erba Sorptomatic 1990 porosimeter, samples were pretreated at 300° C. under vacuum ($10^{-3}/10^{-4}$ bar) for 8 h. An absorption isotherm and nitrogen desorption were registered. The specific surface area was determined with the classical method of Brunauer, Emmett and Teller (BET) and the porosity analysis was conducted based on the desorption curve according to the method of Barret, Joyner and Halenda (BJH). The graph obtained resulting from the test is reported in FIG. 1, in terms of pore volume as a function of the diameter of the same; the measurement is obtained as the derivative of the total pore volume in relation to the variation of their size, curve not shown in the figure for a better readability of the same, and shows the trend of pore volume (dV/dØ, measured in cm$^3$/nm·g; the symbol "Ø" stands for diameter) depending on the diameter of the same (nm). As can be seen in the figure, the distribution of the sample pores reaches maximum between about 4 and 6 nm, around 12 nm and around 23-24 nm. The maximum at 4-6 nm (identified by the box marked by the arrow) is characteristic of the aerogels of the invention, and is not found in other aerogels produced according to other methods.

Example 6

This example is related to the preparation of an aerogel of the invention, in which the surface of the pores is silanized.

The test of Example 5 is repeated, with the following changes to the test parameters:
- 100 ml of silicate solution and 100 ml of 32.5% nitric acid are used;
- during washing with acetone, the solvent is added with a volume of trimethylchlorosilane equal to ⅕ of the gel volume and the gel is kept to react for 12 hours;
- finally 2 washings are carried out with ethyl acetate before drying in supercritical phase.

A hydrophobic aerogel is so obtained.

Figure 2:
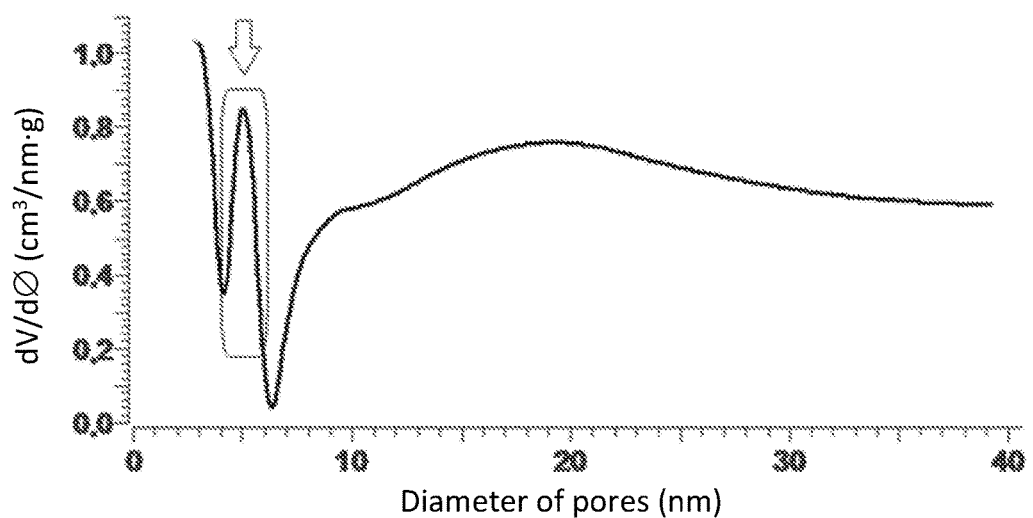

The sample is subjected to a measurement of the porosity size distribution according to the procedures shown in Example 5. The result of the test is reported in FIG. 2, and shows also in this case the porosity peak centered at 4 to 6 nm characteristic of the invention aerogels.

Example 7

The test of Example 1 is repeated, with the following changes to the test parameters:
19.1 g of ash and 300 mL of 10% NaOH are used; in this way a $Na_2O:SiO_2$ molar ratio over 1:1 is obtained in the solution (over-stoichiometric solution);
the silicate solution so obtained has a concentration of $SiO_2$ of 70 g/L;
for gelling a 1:1 ratio by volume between the silicate solution and the 65% nitric acid is used;
the suspension is conducted for a period of 80 minutes to the boiling point T.

A dry gel is obtained with characteristics similar to those of Example 1.

Example 8

The test of Example 5 is repeated, but using 160 mL of 40% nitric acid; a dry gel is obtained with characteristics similar to those of Example 1.

Example 9 (Comparative)

Figure 3:
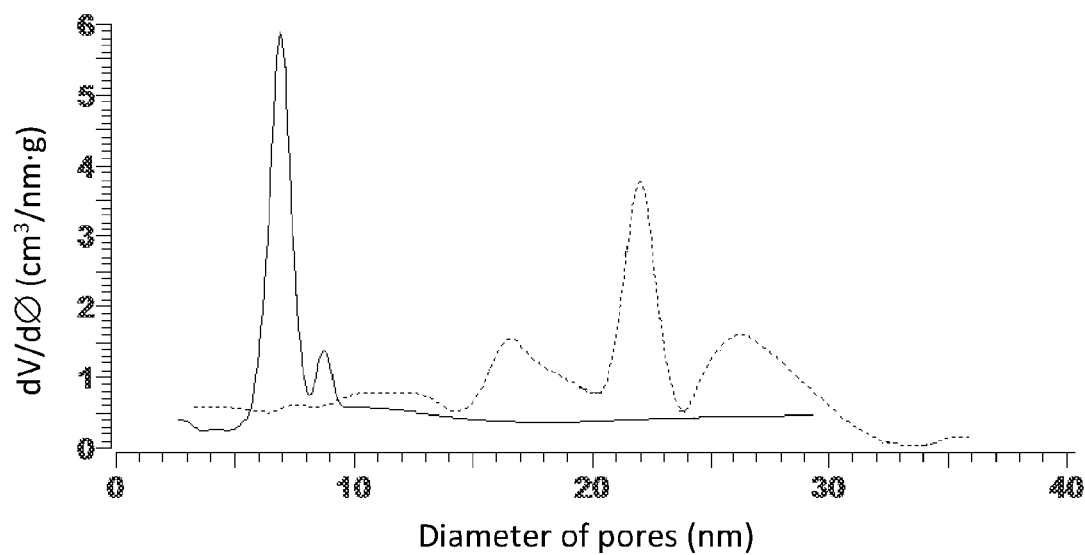
FIGS. 3 and 4 show the distribution of the porosities of two aerogels produced according to prior art methods.

A test of the pores dimensional distribution is carried out on a sample of ENOVA IC3120 commercial aerogel manufactured by company Cabot Corporation. The result is shown in FIG. 3, as a solid line. In this case the porosity of 4 to 6 nm, characteristic of the invention aerogels, is not present.

Example 10 (Comparative)

A test of the pores dimensional distribution is carried out on a sample of aerogel produced from an organic precursor of silica (tetraethoxysilane, TEOS), obtained according to the procedure described in the article "Synthesis of $GeO_2$-doped $SiO_2$ aerogels and xerogels for optical glasses", S. Grandi et al, *J. Non Cryst. Solids,* 303 (2002) 208-217.

The result is shown in FIG. 3, as a dashed line. The porosity of 4 to 6 nm, characteristic of the invention aerogels, is not present.

Example 11 (Comparative)

In this example a prior art process for obtaining aerogels is reproduced, in which an acid is added to a silicate solution of an alkali metal.

15 g of ash resulting from combustion of rice husk are suspended in 100 ml of a 10% NaOH solution.

The suspension obtained is heated to reflux for 4 hours under vigorous mechanical stirring, resulting in the partial solubilization of the solid. A sodium silicate solution having pH=12.6 is so obtained.

190 mL of 1M hydrochloric acid are added to this solution under stirring, while monitoring the pH during the addition; an opalescence of the solution can be seen at about pH=10.5 and immediately after (about 2 minutes) the formation of the gel occurs. It is unable to decrease the pH of the system to values below 10.5.

The drying step in the supercritical phase is carried out according to the methods described in example 1.

The gel so obtained has a density of 0.057 g/ml, a specific surface area of 76 $m^2/g$, and a mesopore volume of 0.16 $cm^3/g$.

Figure 4:
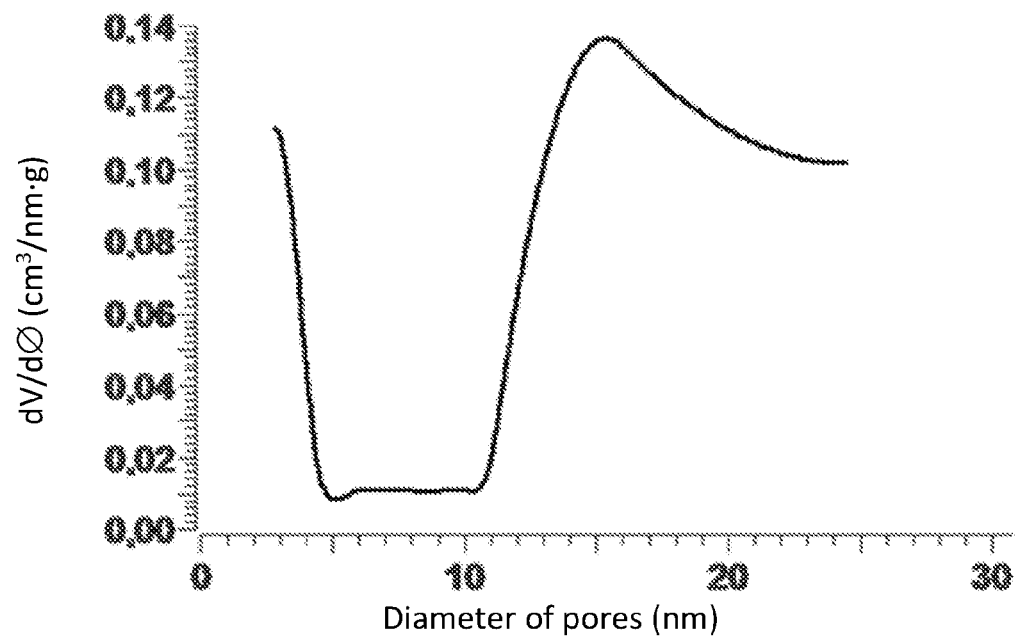

On the sample so obtained a measurement of pores size distribution is carried out. The test results are shown in FIG. 4. Also in this case, the porosity peak centered at 4-6 nm, characteristic of the invention aerogels, is not shown.

Example 12

Following the procedure of Example 5, an aerogel is prepared with a volume of 40 ml. Simultaneously, a second aerogel is prepared, with volume of 40 ml, following an identical procedure, but, unlike the process of the invention, the step in which the two initial solutions are combined is carried out by pouring the acidic solution into the silicate solution up to the gelling point, which occurs at around pH=11. The two aerogels are washed at the same times and with the same volumes of water (about 34 liters) and then treated with acetone and ethyl acetate for drying in a supercritical phase, as described in Example 1. The two aerogel, the first obtained according to the process of the invention (as in Example 5) and the second obtained with gelling at pH=11, are respectively called aerogel A and aerogel B. The chemical composition of the two samples is analyzed with a PERKIN-ELMER Optima 3300 DV ICP optical tool. The sample preparation methodology is the following: a fragment of 0.4089 mg of sample A and a fragment of 0.4218 mg of sample B are treated with 7.5 mL of 65% nitric acid and 1 mL of 30% v/v hydrogen peroxide and subjected to boiling under reflux for one hour. After cooling, the two solutions are diluted 1:10 with tridistilled water and filtered. The solutions are analyzed with the above mentioned instrument, obtaining the results reported in Table 2 for the main alkali metals and alkaline earth metals, in terms of milligrams of metal per kilogram of aerogel (mg/kg), corresponding to ppm.

TABLE 2

| | Content of alkali/earth alkaline metals (ppm) | | | |
| --- | --- | --- | --- | --- |
| | Ca | Mg | Na | K |
| Aerogel A | 200.5 | 21.5 | 1254.0 | 877.5 |
| Aerogel B | 587.5 | 47.5 | 2646.0 | 1652.5 |

Comments on the Results of the Tests

Operating according to the prior art methods (comparative Example 11 and aerogel B of Example 12), dried aerogels are obtained with a density similar to those of the invention, but with a specific surface area and smaller volume of the mesopore. Furthermore, the prior art process has the following problems, which are not however found with the method of the invention:
the method requires the use of a more diluted acid (HCl, 1 M) with respect to the present invention; this entails higher volumes of liquid to be treated, a too diluted solution obtained by the combination of the initial acid and basic solutions, and consequently a lower density gel that cannot be easily handled in the subsequent process steps;
despite the use of a more diluted acid, the formation of the gel still cannot be controlled;

the pH of the wet gel remains basic, and the alkali metals and alkaline earth metals contained in the pores are difficult to remove, as shown by the test data of Example 12.

The invention claimed is:

1. A sol-gel process for the production of a silica aerogel comprising the following steps:
   preparing an aqueous solution of an alkali metal silicate;
   separately preparing in a container a solution of a concentrated inorganic acid selected from sulfuric, hydrochloric, nitric and phosphoric acid;
   combining the aqueous solution of an alkali metal silicate and the solution of a concentrated inorganic acid;
   keeping a system resulting from said combining step at rest up to the formation of a wet gel;
   washing the wet gel obtained from said keeping step to exchange a liquid phase present in pores of the wet gel by means of:
      one or more initial washings with water to remove inorganic compounds dissolved in the liquid phase present in the pores of the wet gel;
      washings with water/acetone mixtures gradually richer in acetone, a washing with pure acetone, and a final exchange with a hypercritical extraction liquid;
   drying the wet gel by extraction in hypercritical conditions of said hypercritical extraction liquid, thereby obtaining an aerogel;
   characterized in that said combining step is carried out by pouring the aqueous solution of an alkali metal silicate into the solution of a concentrated inorganic acid, and operating so that the pH of the system always remains below 1.

2. The process according to claim 1, wherein during said washings of the wet gel, a solvent is admixed with an alkylchlorosilane ($R_3$—Si—Cl, wherein the three R substituents, equal to or different from each other, are alkyl radicals), introducing $R_3$—Si— groups on a surface of the pores of the wet gel.

3. The process according to claim 1, wherein during said combining step, the pH of the system remains at values equal to or lower than 0.

4. The process according to claim 1, wherein said aqueous solution of an alkali metal silicate contains a composition $M_2O \times nSiO_2$ (M=Na, K, Li), wherein n is in the range from 0.67 to 4, and from 50 to 150 mg/mL $SiO_2$.

5. The process according to claim 1, wherein said aqueous solution of an alkali metal silicate is prepared by dissolving a silica-containing material with a solution of an alkali hydroxide at a concentration of between 10% and 20% by weight.

6. The process according to claim 5, wherein said silica-containing material is an ash resulting from combustion of a plant biomass containing at least 10% by weight of silica.

7. The process according to claim 6, wherein said ash is obtained from combustion of rice husk or rice straw.

8. The process according to claim 1, wherein said concentrated inorganic acid is selected from a solution of HCl 37% by weight and a solution of $HNO_3$ from 40 to 65% by weight.

9. The process according to claim 1, wherein amounts of the aqueous solution of an alkali metal silicate and the solution of a concentrated inorganic acid used during said combining step yield a final density of the aerogel that is between 0.01 and 0.3 g/mL.

10. The process according to claim 9, wherein the final density of the aerogel is between 0.05 and 0.12 g/mL.

11. The process according to claim 1, wherein the hypercritical extraction liquid is carbon dioxide.

12. The process according to claim 1, further comprising:
    subjecting the resulting aerogel to a heat treatment in an oxidizing atmosphere consisting of oxygen, air or synthetic oxygen/nitrogen mixtures, at a temperature of between 300 and 800° C.

* * * * *